United States Patent
Theener

(10) Patent No.: US 10,330,238 B2
(45) Date of Patent: Jun. 25, 2019

(54) PIPELINE PIG LAUNCHER

(71) Applicant: Ronald E. Theener, Duchesne, UT (US)

(72) Inventor: Ronald E. Theener, Duchesne, UT (US)

(*) Notice: Subject to any disclaimer, the term of this patent is extended or adjusted under 35 U.S.C. 154(b) by 161 days.

(21) Appl. No.: 15/704,166

(22) Filed: Sep. 14, 2017

(65) Prior Publication Data

US 2019/0078722 A1    Mar. 14, 2019

(51) Int. Cl.

| F16L 55/46 | (2006.01) |
|---|---|
| B08B 9/053 | (2006.01) |
| F16L 55/38 | (2006.01) |
| F16L 101/20 | (2006.01) |
| F16L 101/12 | (2006.01) |
| F16L 101/30 | (2006.01) |
| B08B 9/055 | (2006.01) |

(52) U.S. Cl.
CPC ............. *F16L 55/46* (2013.01); *B08B 9/053* (2013.01); *F16L 55/38* (2013.01); *B08B 9/055* (2013.01); *F16L 2101/12* (2013.01); *F16L 2101/20* (2013.01); *F16L 2101/30* (2013.01)

(58) Field of Classification Search
CPC ....... F16L 55/46; F16L 55/38; F16L 2101/12; F16L 2101/20; F16L 2101/30; B08B 9/053; B08B 9/055
USPC .............................. 15/3.5, 104.062; 137/268
See application file for complete search history.

(56) References Cited

U.S. PATENT DOCUMENTS

| 3,125,116 A * | 3/1964 | Schaberg ................ F16L 55/46 137/268 |
| 3,218,659 A * | 11/1965 | Rowley ................... F16L 55/46 137/268 |
| 3,266,076 A * | 8/1966 | Surber .................... F16L 55/46 137/268 |
| 3,779,270 A * | 12/1973 | Davis ..................... F16L 55/46 137/268 |
| 5,139,576 A * | 8/1992 | Davis ..................... F16L 55/46 134/18 |
| 6,769,152 B1 * | 8/2004 | Crenshaw ............... F16L 55/46 15/104.062 |

FOREIGN PATENT DOCUMENTS

GB         2368890 A  *  5/2002    ............. F16L 55/46

* cited by examiner

*Primary Examiner* — Laura C Guidotti

(57) ABSTRACT

A pipeline pig launching system for a gas pipeline, including a pressure bottle, a two-chambered drip leg, and a pig launcher barrel. Condensate from the gas in the pipeline collects in the upper chamber of the drip leg and flows through an equalizer line to the lower chamber. The pressure bottle receives gas from the pipeline, and has an adjustable pressure relief valve at its outlet. When the pressure bottle reaches a preset level the relief valve opens and pressurized gas enters the lower chamber of the drip leg and forces the condensate out of the drip leg to an inlet of the pig launcher barrel. The pig in the launcher barrel is then pushed into the pipeline at a point downstream from the drip leg. A booster line may also be included in the system to provide a direct connection between the outlet of the pressure bottle and the inlet of the pig launcher barrel.

8 Claims, 3 Drawing Sheets

PIPELINE PIG LAUNCHER

BACKGROUND OF THE INVENTION

Field of the Invention

The present invention relates to the field of pipeline accessories, and more particularly to a pipeline pig launcher.

Description of Art

Pipelines carrying fluids, such as petroleum, natural gas, or other fluids can be inspected or cleaned by inserting a pig into the pipeline and pushing the pig through the pipeline to a point where the pig is removed. A pipeline pig can be any device that can move through a pipeline to scrape and clean an interior of the pipeline, or remove liquids or gases from the pipeline.

Pipeline pig launchers are used to introduce pigs into the pipeline without interrupting flow. Pipeline pigs can be launched into pipelines by providing launch stations and catcher stations at multiple points where a pig will be inserted and removed. The insertion and retrieval of a pipeline pigs can be performed with human operators, or auxiliary devices.

Automatic pig launchers, that are in use are expensive systems and require electricity, computers and GPS to operate. These are typically used on bigger pipelines of 12 inches or more in size. Pigs are generally used to keep the liquid in the line cleared out to make room for the gas. The liquids can be processed when it gets to a gas plant or water knock out facility.

Many smaller remote wells use a smaller 2-inch to 4-inch plastic line that runs to a central tank location. This plastic line can't withstand higher pressures and normally runs at 40 to 60 psi. Known pipeline pig launchers are far too complicated and expensive to use in remote locations.

As a consequence of the foregoing situation, there has existed a longstanding need for a new and improved pipeline pig launcher that is simple and inexpensive, and the provision of such a construction is a stated objective of the present invention.

BRIEF SUMMARY OF THE INVENTION

Briefly stated, the present invention provides a pipeline pig launching system for a gas pipeline, including a pressure bottle, a two-chambered drip leg, and a pig launcher barrel. Condensate from the gas in the pipeline collects in the upper chamber of the drip leg and flows through an equalizer line to the lower chamber. The pressure bottle receives gas from the pipeline, and has an adjustable pressure relief valve at its outlet. When the pressure bottle reaches a preset level the relief valve opens and pressurized gas enters the lower chamber of the drip leg and forces the condensate out of the drip leg to an inlet of the pig launcher barrel. The pig in the launcher barrel is then pushed into the pipeline at a point downstream from the drip leg. A booster line may also be included in the system to provide a direct connection between the outlet of the pressure bottle and the inlet of the pig launcher barrel.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings wherein.

DETAILED DESCRIPTION OF THE INVENTION

Figure 1:
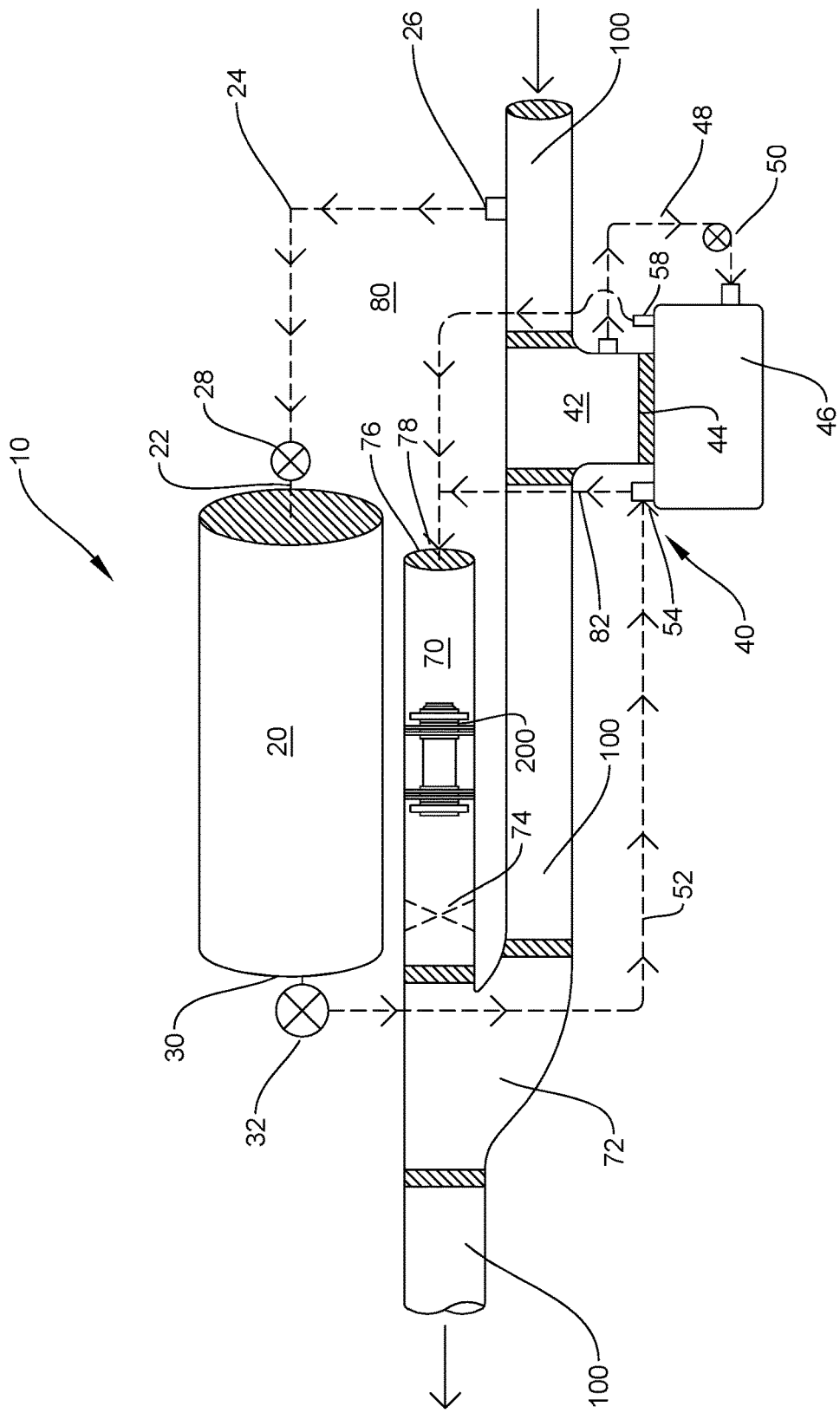
FIG. 1 is a perspective schematic view showing the pipeline pig launching system of the present invention; with the fluid flow indicated in dashed lines.
Figure 2:
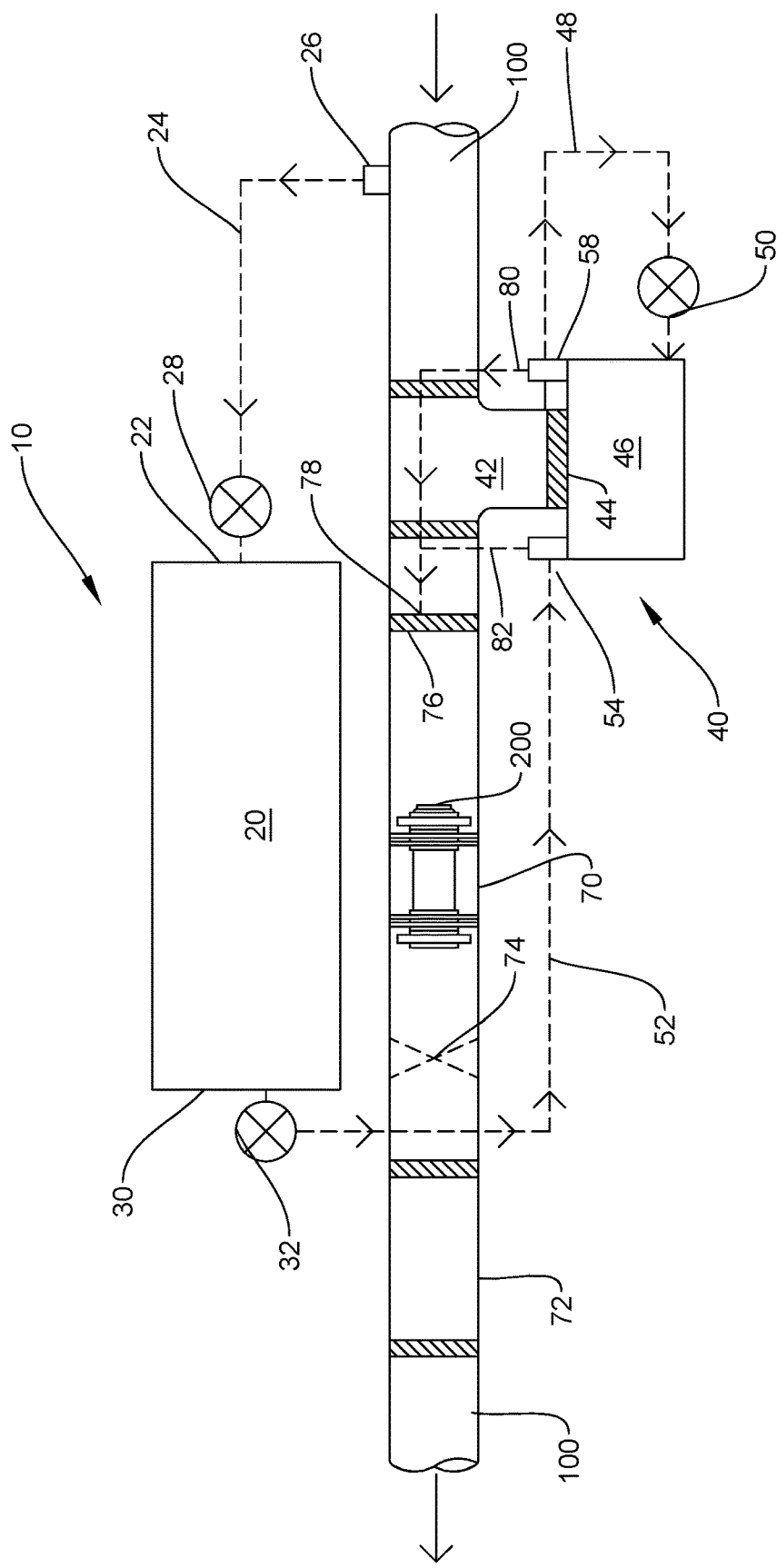
FIG. 2 is a left side elevational schematic view thereof.

As can be seen by the reference to the drawings, and particularly to FIG. 1, the pipeline pig launching system that forms the basis of the present invention is designated generally by the reference number 10. The launching system 10 is incorporated into a pipeline 100 that carries well head gas under pressure.

The launching system 10 includes a pressure bottle 20, a two-chambered drip leg 40, and a launcher barrel 70.

The pressure bottle 20 has an inlet 22 that is connected by a line 24 to the tap 26 from the pipeline 100. The inlet 22 has a check valve 28 to prevent gas from flowing back to the pipeline 100. The outlet 30 of the pressure bottle 20 has a selectively adjustable pressure relief valve 32.

The drip leg 40 extends down from the pipeline 100 and collects condensate from the gas. The drip leg 40 has an upper chamber 42 separated by a plug 44 from a lower chamber 46. An equalizer line 48 interconnects the upper chamber 42 and the lower chamber 46, and includes a check valve 50 to prevent the flow of fluid from the lower chamber 46 back to the upper chamber 42. The lower chamber 46 is connected by a line 52 to the outlet 30 of the pressure bottle 20.

The launcher barrel 70 is attached to the pipeline 100 downstream from the drip leg 40. The barrel 70 is attached by a Y fitting 72 to place the barrel 70 in longitudinal alignment with the pipeline 100 while providing a smooth transition into the pipeline 100 at the point where the barrel 70 attaches. The barrel 70 has an isolation valve 74 near the junction with the pipeline 100. A selectively removable end cap 76 has an inlet 78 connected by a line 80 to an outlet 58 from chamber 46 of the drip leg 40.

Figure 3:
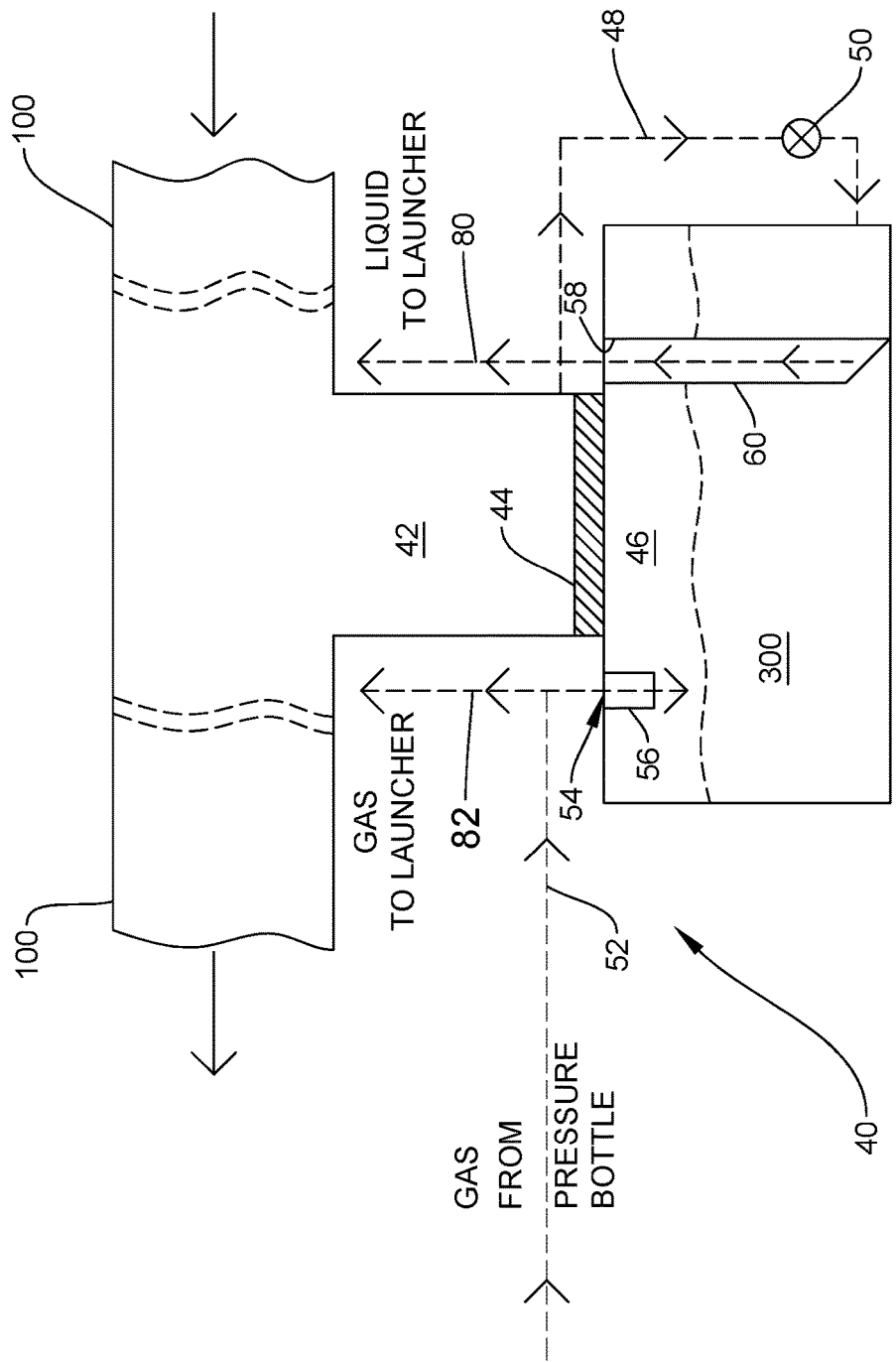
FIG. 3 is an enlarged side elevational sectional schematic view illustrating the interior components of the drip leg.

As best shown in FIG. 3, the inlet 54 of the drip leg 40 carries a short collar 56, and the outlet 58 carries an elongated tube 60 that extends down to a lower portion of the lower chamber 46. Also, a booster line 82 branches from line 52 coming from the pressure bottle 20 near the drip leg inlet 54, and delivers high pressure gas directly to the inlet 78 of the launcher barrel 70.

Although adaptable to various sized pipelines, the pig launching system 10 of the present invention was designed specifically for, and is best suited for use with, a smaller 2-4-inch plastic pipeline operating at pressures in the range of 40-60 psi.

In operation, the isolation valve 74 of the launcher barrel 70 is closed, the end cap 76 is removed, the pig 200 is placed in the barrel 70, the end cap replaced, and the isolation valve 74 is then reopened so the pig 200 can be launched into the pipeline 100. The pressure relief valve 32 is then set at the appropriate setting in the range of 60-75 psi.

Condensate from the gas in the pipeline 100 flows into the upper chamber 42 of the drip leg 40, and then passes through the equalizer line 48 into the lower chamber 46.

Gas flows though line 24 coming from the pipeline 100 and enters the pressure bottle 20. Pressure then begins to build in the pressure bottle until it reaches the pressure that is set on the pressure relief valve 32. The frequency at which pigs 200 can be launched can be varied by varying the pressure setting of the relief valve 32.

When the preset pressure is reached, the relief valve 32 opens and high-pressure gas flows into the lower chamber 46 of the drip leg 40 through the inlet 54 causing the liquid to be pushed out through the outlet 58. The elongated tube 60 is connected to the outlet 58 so that most of the liquid 300 is evacuated from the lower chamber 46, and travels with the gas though the line 80 to the inlet 78 of the launcher barrel 70. The check valve 50 in the equalizer line 48, prevents loss of pressure through the upper chamber 42 back to the pipeline 100. Also, the booster line 82 can be opened to provide high pressure gas directly from the pressure bottle 20 to the barrel inlet 78.

Although only an exemplary embodiment of the invention has been described in the detail above, those skilled in the art will readily appreciate that many modifications are possible without materially departing from the novel teachings and advantages of this invention. Accordingly, all such modifications are intended to be included within the scope of the invention as defined in the following claims.

The invention claimed is:

1. A pig launching system for a pipeline having a pressure source, the system comprising:
    a pressure bottle including an inlet connected in fluid communication with the pressure source, and an outlet having a pressure relief valve;
    a drip leg extending down from the pipeline, the drip leg including an upper chamber disposed in fluid communication with the pressure source, and a lower chamber sealed from the upper chamber;
    an equalizer line interconnecting and allowing fluid flow from the upper chamber to the lower chamber, the equalizer line including a check valve preventing fluid flow from the lower chamber back to the upper chamber;
    the lower chamber including an inlet connected in fluid communication with the outlet of the pressure bottle, and an outlet; and
    a launcher barrel attached to and disposed in longitudinal alignment with a portion of the pipeline downstream from the drip leg, the barrel having a pig discharge end disposed in fluid communication with the pipeline, and a pig loading end with an inlet connected in fluid communication with the outlet of the drip leg.

2. The system of claim 1, wherein the pressure relief valve at the outlet of the pressure bottle is selectively adjustable.

3. The system of claim 2, wherein the pressure source of the pipeline ranges from 40 to 60 psi, and the pressure relief valve is adjustable in the range of 60 to 75 psi.

4. The system of claim 1, wherein the outlet of the lower chamber of the drip leg includes a tube that extends down to a lower portion of the lower chamber.

5. The system of claim 1, wherein the pig loading end of the launcher barrel includes a selectively removeable end cap, and wherein the inlet of the launcher barrel is located in the end cap.

6. The system of claim 5, wherein the launcher barrel includes an isolation valve disposed between the discharge end and the end cap.

7. The system of claim 1, wherein a booster line is disposed to connect the outlet of the pressure bottle and the inlet at the loading end of the launcher barrel.

8. The system of claim 1, wherein the launcher barrel is connected to the pipeline with a Y fitting.

* * * * *